UNITED STATES PATENT OFFICE.

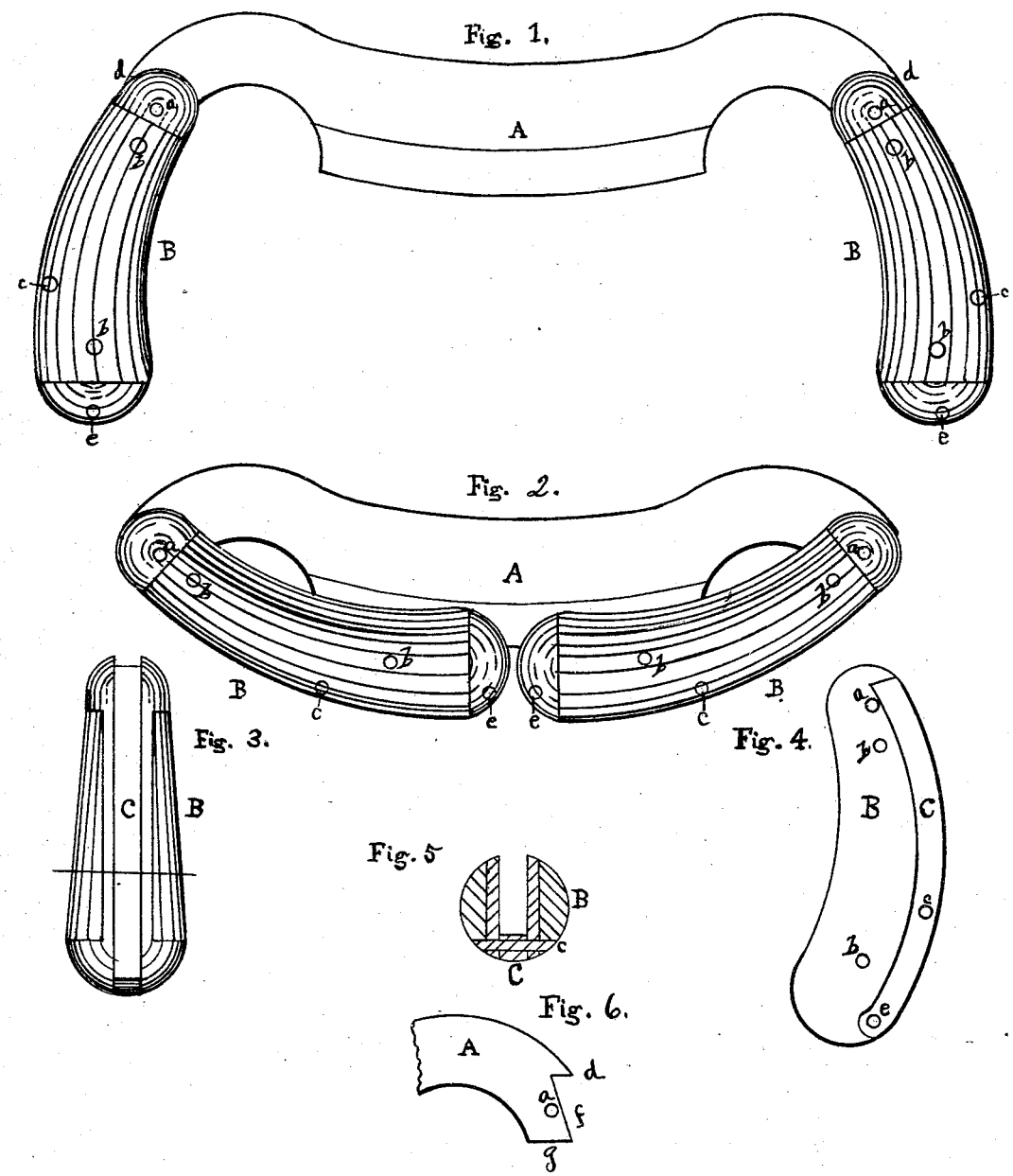

MIDAS BROOKS, OF CHICAGO, ILLINOIS.

IMPROVEMENT IN DRAWING-KNIVES.

Specification forming part of Letters Patent No. 145,485, dated December 16, 1873; application filed January 15, 1873.

*To all whom it may concern:*

Be it known that I, MIDAS BROOKS, of the city of Chicago, in the county of Cook and State of Illinois, have invented a certain new and useful Improvement in Drawing-Knives, of which the following is a full description, reference being had to the accompanying drawings making a part of this specification, in which—

Figure 1 is a view of the knife with the handles open; Fig. 2, a view with the handles closed; Fig. 3, a view of one of the handles removed; Fig. 4, a view of one handle with one part removed, showing the spring; Fig. 5, a section on line $x$ $x$ of Fig. 3; and Fig. 6, a detail.

Drawing-knife handles are usually attached rigidly to the shave, and occupy much room in storage or on the bench. They have sometimes been jointed by a loose joint, with such joint covered by a slide, but when loosened they are liable to come against the edge and dull or nick it. The object of my invention is to prevent the handles from coming in contact with the cutting-edge, and to cause the handles to fold down over the edge so as to guard it and prevent the intrusion of any article between the handles and blade when folded.

In the drawings, A represents the blade; B B, the handles; C C, springs; $a$ $a$, pins for pivoting the handles to the blade; $b$ $b$ $b$ $b$, rivets for securing the different parts of the handle together; $c$ $c$ $e$ $e$, pins for securing the springs in place; $d$ $d$, recesses in the outer ends of the blade. The blade A is made as usual, except a notch, $d$, is made in the outside of each end, in which the spring C fits, when the handle is opened to prevent the spring from throwing the handle too far. (See Fig. 6.) When open, the spring presses against the flat space $f$ and shoulder $d$, so as to make the handle sufficiently rigid, and when closed, it presses against the flat end $g$ to hold the handles away from the edge, as shown in Fig. 2. Each handle is made of two parts, as shown in Figs. 3 and 5, and between these two parts a stiff spring, C, is placed and securely held by means of two pins, $c$ $e$, passing through it and the handle, as shown in Figs. 1, 2, and 4. The handles should be long enough so that, when closed, they will cover, or nearly cover, the cutting-edge of the blade. A piece of thin wood or of leather laid against the back springs will prevent injury from forcing the handles onto the edge.

The spring C should be stiff and strong enough to prevent the handles from being opened too easily, and yet give sufficient firmness to them when open, that the shave can be used without their closing suddenly.

The handles are pivoted to the blade by means of the pin $a$, which pin, to secure the best results, should be placed on a line with the edge of the blade. (See Figs. 1 and 2.)

The handles B may be made of metal wholly, or partly of metal and partly of wood, as shown. The spring C is made of cast-steel.

When used, the handles are opened in the position shown in Fig. 1, and the operation is similar to that of other shaves. When not in use the handles are closed so as to form a guard for the edge, as shown at Fig. 2.

For convenience, the edge of the shave may be beveled on both sides.

The following are among the advantages of these handles over those heretofore used: The shave can be left on the bench without any danger of nicking it, as the handles when closed form a guard for the whole cutting-edge; it can be placed in a chest without coming in contact with any hard substance that would injure its cutting-edge, and will occupy less room.

What I claim as new is as follows:

The implement herein described, having blade A, slotted handles B, with spring C, notch $f$ $d$, and end $g$, all constructed and arranged as and for the purpose specified.

MIDAS BROOKS.

Witnesses:
O. W. BOND,
HENRY O. BROWN.